United States Patent [19]

Cardenas

[11] Patent Number: 5,636,717
[45] Date of Patent: Jun. 10, 1997

[54] BRAKE SHOE ASSEMBLY

[76] Inventor: Richard A. Cardenas, 9326 Alta Mira Dr., Dallas, Tex. 75218

[21] Appl. No.: 658,219

[22] Filed: Jun. 4, 1996

[51] Int. Cl.$^6$ ............................................. F16D 69/00
[52] U.S. Cl. ................................ 188/250 G; 188/250 D
[58] Field of Search ................................ 188/234, 238, 188/240, 242–246, 250 B, 250 E, 250 G; 192/70.13, 70.19, 70.22, 76

[56] References Cited

U.S. PATENT DOCUMENTS

| | | | |
|---|---|---|---|
| 2,480,947 | 9/1949 | McEachran | 188/245 |
| 2,541,979 | 2/1951 | Amundsen | 188/245 |
| 5,469,942 | 11/1995 | Krumm, Sr. | 188/250 G |

FOREIGN PATENT DOCUMENTS

| | | | |
|---|---|---|---|
| 497633 | 4/1930 | Germany | 188/244 |
| 497634 | 4/1930 | Germany | 188/244 |

*Primary Examiner*—Robert J. Oberleitner
*Assistant Examiner*—Chris Schwartz
*Attorney, Agent, or Firm*—Thomas S. Baker, Jr.

[57] ABSTRACT

A novel brake shoe assembly is provided with a brake shoe table having a generally arcuate friction material support surface, a friction material preform supported by the brake shoe table friction material support surface and having a peripheral side groove, fixed retainer clips mounted on the brake shoe table and engaging the friction material form groove, and relatively rotatable retainer clips removably and threadably mounted on the brake shoe table, engaging the friction material form groove, and imparting additional clamping forces to said friction material preform when being tightened and rotated counterclockwise relative to the brake shoe table.

4 Claims, 4 Drawing Sheets

BRAKE SHOE ASSEMBLY

FIELD OF THE INVENTION

This invention relates generally to braking systems for truck-like heavy-duty automotive vehicles, and particularly concerns a rivet-free brake shoe assembly construction which facilitates roadside-replacement of an assembly worn friction material lining, as in an emergency, without having to either raise and dismount the incorporating wheel or disassemble its brake actuating mechanism.

BACKGROUND OF THE INVENTION

Automotive vehicle brake shoe assemblies in which the assembly friction material or shoe lining element is secured to the shoe lining support element by readily removable, non-rivet fasteners are well-known in the automotive vehicle braking system arts. See for instance, U.S. Pat. No. 1,934,448 issued to Roth for a teaching of a brake shoe lining having dovetail pockets and separately fastened lining retention plates that co-operate with the lining dovetail pockets.

U.S. Pat. No. 2,361,307 granted to Merritt also discloses a removable brake shoe lining but with metallic retention clips situated in the lining face and having integral legs which project through co-operating slot openings in the assembly lining and lining support elements.

U.S. Pat. No. 3,650,360 issued to King et al. and U.S. Pat. No. 4,867,285 issued to Gatlin each discloses a brake shoe construction in which both the brake shoe lining support and the friction material lining element are made removable.

Likewise, U.S. Pat. No. 5,119,909 granted to Shim teaches a roadside-repairable brake construction in which both the brake friction material and the shoe support for the friction material are made readily removable.

U.S. Pat. No. 5,469,942 issued in the name of Krumm, St. discloses a roadside-repairable brake construction in which the preformed brake friction material is secured to the brake shoe table element by both fixed wedge clips and removable wedge clips, the removable wedge clips being limited to non-rotational movement.

France Patent No. 757,380 issued in the name of Bordoni discloses a brake shoe construction that is essentially cumulative with respect to the showing of the above-discussed U.S. Patent issued to Krumm, Sr.

France Patent No. 760,231 issued to Treherne also discloses the use of fixed wedge-like surfaces to accomplish a friction material hold-down function but does not develop friction material wedge hold-down as a consequence of forces applied laterally with respect to the brake shoe table element.

France Patent No. 2,003,074 granted to Girling Limited discloses the use of removable clips for retaining the friction material of a brake shoe assembly on the brake shoe table element but makes no suggestion of a wedging action to create downward clamping forces.

Although the known brake assembly constructions make use of both fixed and movable wedge surfaces to both retain and clamp the friction material element both on and against the included brake shoe table element, none of the prior art constructions disclose and arrangement wherein a retainer clip is rotated relative to the brake table during installation and in a manner whereby the friction material is additionally urged downward against the table surface by the side retainer clips during tightening of the removable side retention clips.

Other objectives and advantages associated with the present invention will become apparent during a careful consideration of the details which follow.

SUMMARY OF THE INVENTION

The brake shoe assembly of the present invention is basically comprised of a reinforced brake shoe table element, removable brake shoe friction material elements supported by the brake shoe table element and each having a recessed mounting groove around its peripheral sides, and both fixed side and end wedge-like retainer clips and removable wedge-like retainer clips that are mounted on the brake shoe table element and co-operate with the friction material element peripheral side grooves to securely retain the friction material element on the brake shoe table element. The removable wedge-like retainer clips are so designed and mounted on the brake shoe table that during engagement with the friction material mounting grooves and tightening such are rotated relative to the friction material element causing a downward force to be applied to the friction material to increase the forces clamping the friction material element against the support surface of the brake shoe table element.

Another embodiment of the brake shoe assembly of the present invention replaces certain of the fixed wedge-like end retainer clip elements incorporated in the assembly with an adjustable and partially-removable end wedge subassembly that develops the increased clamping forces for the assembly friction material elements. Such wedge elements also have a readily replaceable installation characteristic.

DETAILED DESCRIPTION

Figure 1:
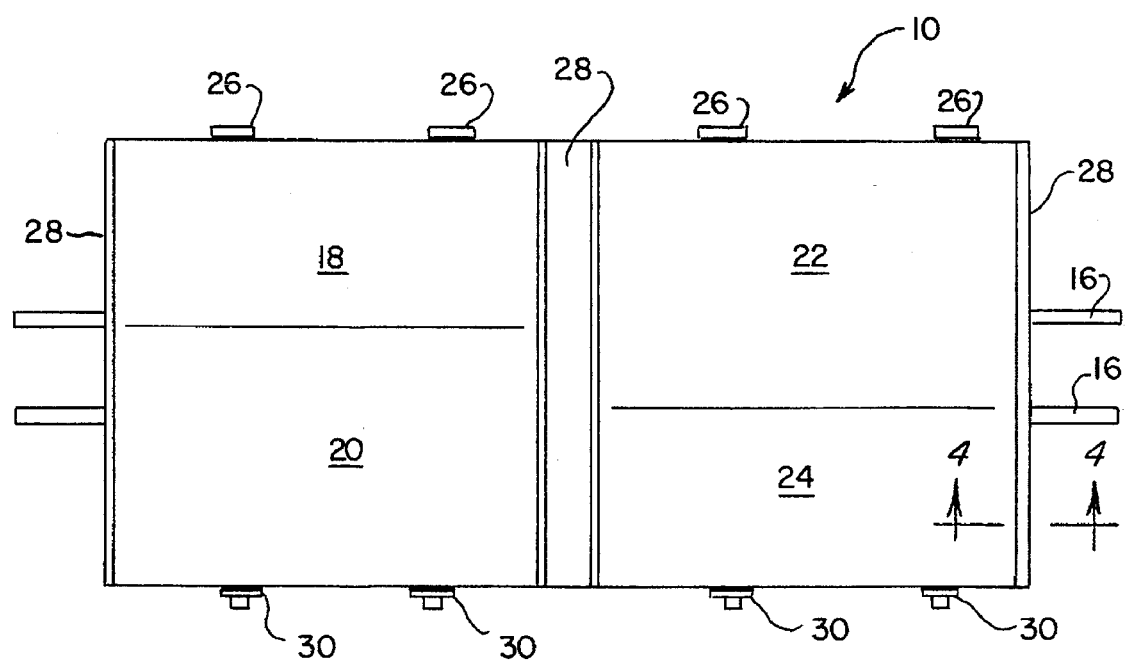
FIG. 1 is a plan view of a preferred embodiment of the brake shoe assembly of the present invention.
Figure 2:
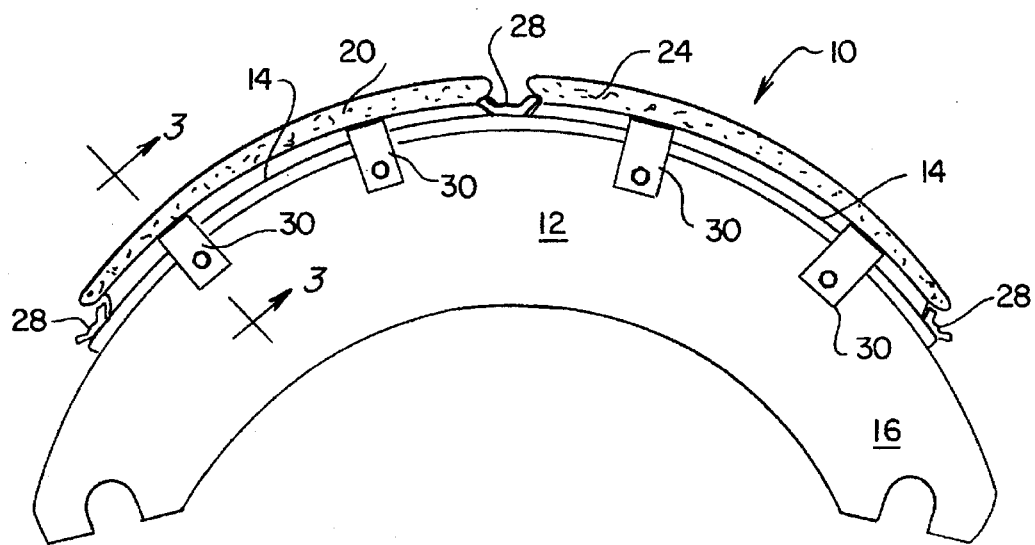
FIG. 2 is an elevation view of the brake shoe assembly of FIG. 1.

FIGS. 1 and 2 illustrate a preferred embodiment of the present brake shoe assembly invention. Such assembly is designated by the reference numeral 10 in the drawings and is basically comprised of a brake shoe table element 12 having a generally cylindrical friction material element support surface 14 and integrally joined reinforcing ribs 16, friction material elements 18 through 24 supported by support surface 14 of brake shoe table element 12, and retainer clips 26 through 30 which secure and clamp friction material elements 18 through 24 to table element 12.

Retainer clip elements 26 and 28 and are preferably formed of steel stampings and are welded in position to metallic brake shoe table 12. Each removable retainer clip element 30 is comprised of three basic components. One is an angled support component 32 that also is preferably a steel stamping that is welded to the underside of brake shoe table element 12 as shown. Another component of removable retainer clip element 30 is an angled clip 34 that is also preferably a steel stamping that engages or co-operates with the peripheral side groove 40 of friction material element 20. Lastly, each removable retainer clip element 30 also includes a conventional threaded fastener that couples angled clip component 34 to angled support component 32. The threaded stem of the fastener passes through a co-operating slot provided in angled clip component 34 and engages a threaded nut that is welded to one side of angled support component 32 in alignment with a hole for receiving the stem of the threaded fastener.

Figure 5:
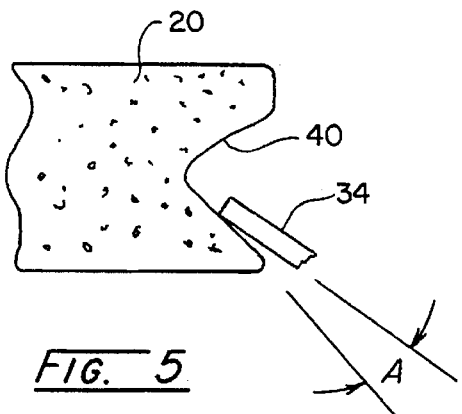
FIG. 5 is an enlarged view of a portion of FIG. 3.
Figure 4:
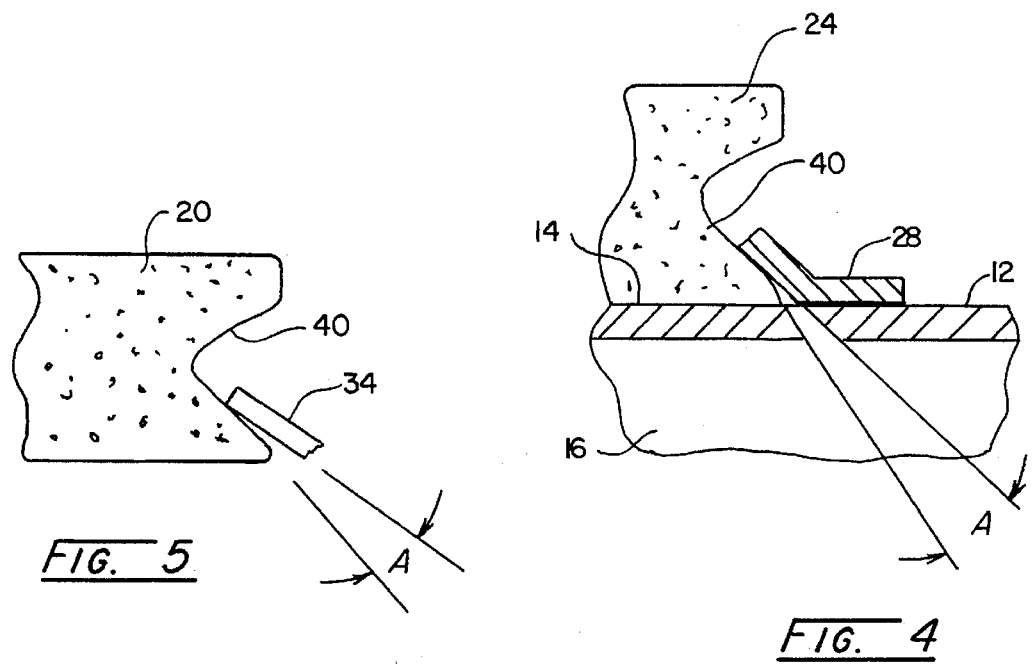
FIG. 4 is a section view taken at line 4—4 of FIG. 2 to more clearly illustrate the fixed end retainer clips included in the assembly of FIGS. 1 and 2.

In order to obtain the clamping advantages associated with the present brake shoe assembly invention care must be taken in forming the angles of the sloping surfaces of the peripheral side grooves provided in friction material elements 18 through 24 and the cooperating angled surfaces of retainer clip elements 26 through 30. The desired angular relationship between such components is more clearly shown in FIG. 5. Essentially, it is preferred that the angle of divergence A shown in FIG. 5 be at least approximately 3° to 5° or greater. Such is preferred so that any force moving a friction material element either laterally or longitudinally on support surface 14 develops a reaction vector component that forces the friction material component radially downward toward the center of curvature of brake shoe table element support surface 14.

Figure 3:
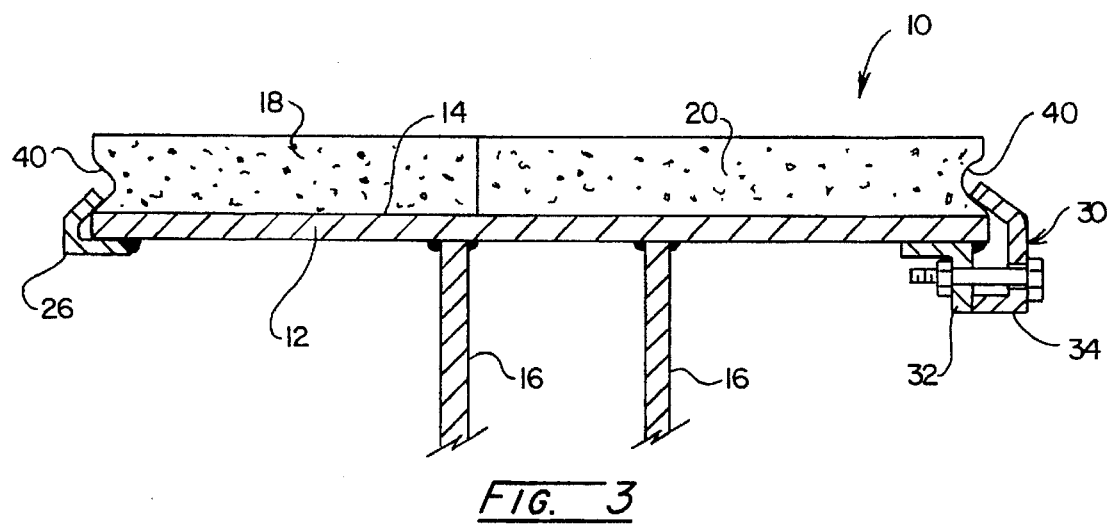
FIG. 3 is a section view taken at line 3—3 of FIG. 1 to more clearly illustrate the fixed and removable side retainer clips included in the assembly of FIGS. 1 and 2.

Additionally, the construction of removable side retainer clip element 30 is such that tightening the threaded fastener that joins angled clip component 34 to angled support component 32 causes the former component to be rotated in a counter-clockwise direction (FIG. 3) to develop an additional clamping force at the point where the point of angled clip component 34 contacts the angled surface of the side peripheral groove 40 provided in the cooperating friction material element.

Figure 6:
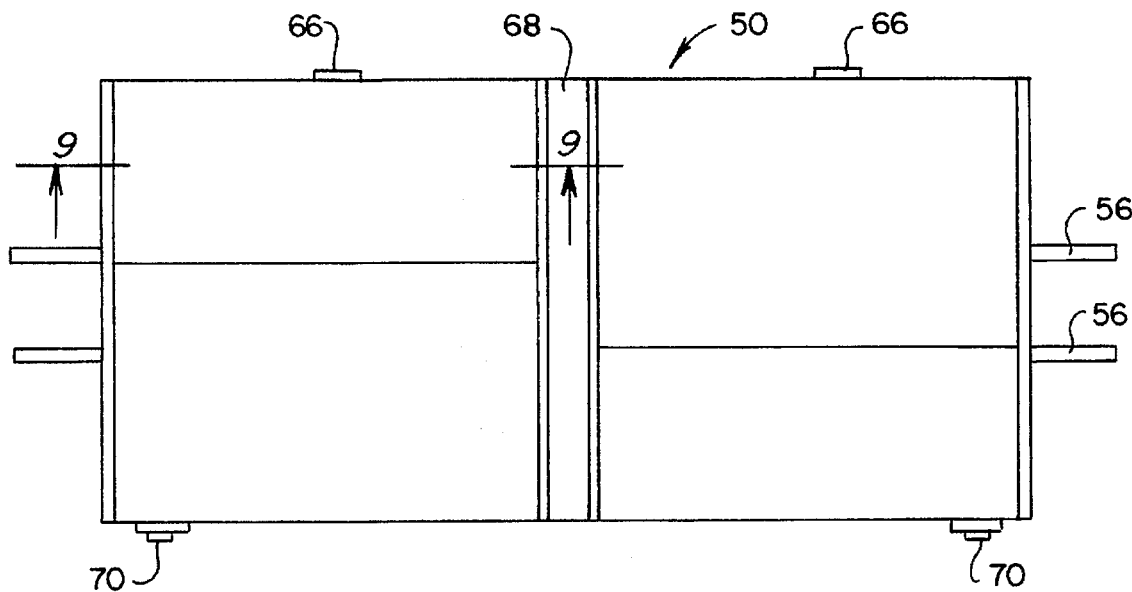
FIG. 6 is a plan view of an another embodiment of the brake shoe assembly of the present invention.
Figure 7:
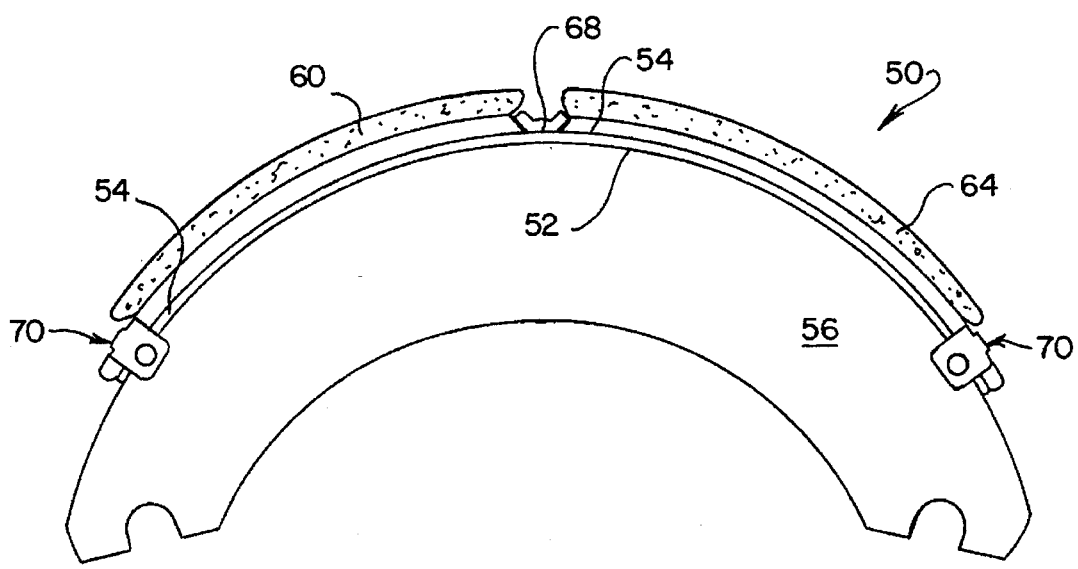
FIG. 7 is an elevation view of the brake shoe assembly of FIG. 6.

The additional embodiment of the invention detailed in the drawings substitutes a novel and partially-removable end retainer clip element in the invention assembly construction for certain of the removable side retainer clip elements 30. As shown in FIGS. 6 and 7, the alternate assembly embodiment 50 is basically comprised of a conventional brake shoe table element 52 also having a generally cylindrical friction material element support surface 54 and integrally joined reinforcing ribs 56, friction material elements 58 through 64 supported by support surface 54, and retainer clips 66 through 70 which secure and clamp friction material element 58 through 64 to table element 52.

Figure 8:
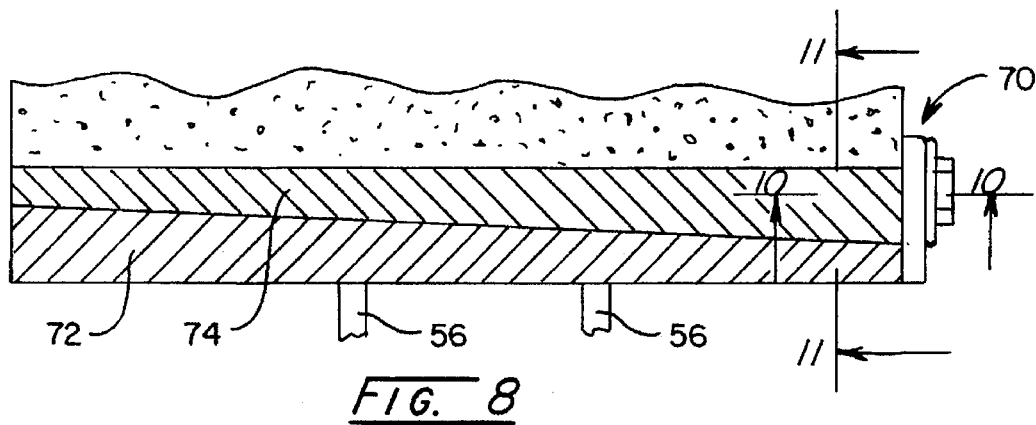
FIG. 8 is a plan view of a portion of the brake shoe assembly of FIG. 6 illustrating the included adjustable end wedge subassembly more clearly.

Elements 66 and 68 of the alternate embodiment are essentially the same as elements 26 and 28 of FIGS. 1 through 4. End retainer clip elements 70, however, differ appreciably from removable side retainer clip elements 30. As shown in FIG. 8, sub-assembly 70 is comprised of co-operating wedge elements 72 and 74 with wedge element 72 being fixedly welded in position along its length to table element 52 and wedge element 74 being both adjustable and readily removable from assembly 50.

Figure 11:
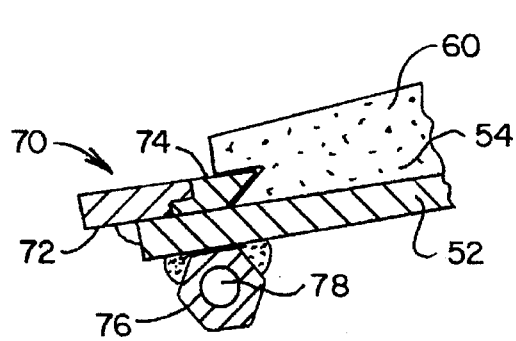
FIG. 11 is a section view taken at line 11—11 of FIG. 8.
Figure 10:
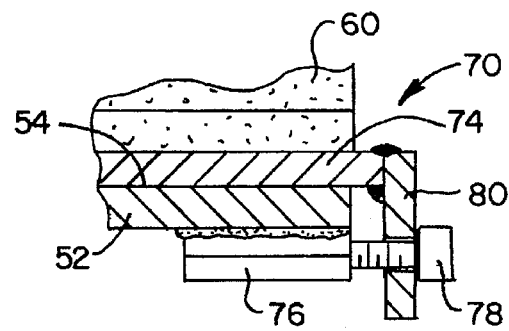
FIG. 10 is a section view taken at line 10—10 of FIG. 8.

As detailed in FIGS. 10 and 11, removable wedge element 74 is restrained against movement normal to the support surface 54 of table element 54 by its "ship lap" mesh with fixed wedge element 72. A threaded connection comprised of nut element 76 welded to brake shoe table 52, a threaded adjustment screw member 78 engaged with nut element 76, and a tang element 80 welded to movable wedge element 74. The threaded shank of adjustment screw member 78 passes through an opening 82 provided in tang element 80, which opening is necessarily smaller than the head portion of screw element 78.

Figure 9:
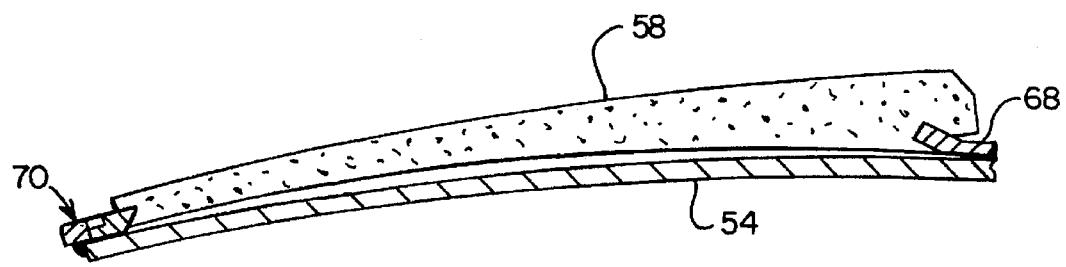
FIG. 9 is a section view taken at line 9—9 of FIG. 6.

Lateral adjustment motion may be imparted to wedge element 74 through the threaded connection and friction material elements 58 through 64 are preferably installed by tightening adjustment screws 78 to a degree that causes some additional curvature to be imparted to those elements. Such additional "bowing" is illustrated in section in FIG. 9 in an exaggerated manner. It has been found that the additional curvature imparted to the friction material elements tends to be reduced during the braking process such that the friction material becomes biased more tightly against the wedge elements 72 and 74 and retainer clips 66 and 68. In other words, the radius of curvature of the friction material is increased and the friction material becomes more firmly locked to the table element 52. The tight engagement of the friction material also reduces noise emanating from the brake assembly during the braking process.

Various changes may be made with respect to the relative sizes, shapes, and materials utilized in the disclosed brake shoe assembly invention without departing from the scope or intent of the following claims.

I claim as my invention:

1. A brake shoe assembly comprising:
   a reinforced brake shoe table element having a generally cylindrical support surface for supporting a preformed friction material element;
   a preformed friction material element supported by said brake shoe table support surface and having at least two peripheral grooves;
   first retainer clip means fixedly secured to said brake shoe table element and engaging one of said friction material element peripheral grooves; and
   second retainer clip means having a fixed element rigidly secured to said brake shoe table element and a movable angled element;
   said movable angled element being removably and threadably secured to said fixed element by a threaded fastener and engaging another of said friction material element peripheral grooves, said movable angled element of said second retainer clip means being rotated counterclockwise relative to said fixed element and said friction material element peripheral groove when said threaded fastener is tightened in its secured relation to said fixed element to cause said movable angled element to exert a clamping force urging said friction material element laterally toward said first retainer clip means and downwardly into a clamped condition relative to the support surface of said reinforced brake shoe table element.

2. A brake shoe assembly comprising:
   a reinforced brake shoe table element having a generally cylindrical support surface for supporting a preformed friction material element;
   a preformed friction material element defined by four peripheral side walls and supported by said brake shoe table support surface and having peripheral grooves formed in at least two of said peripheral side walls;
   first retainer clip means fixedly secured to said brake shoe table element and engaging one of said friction material element peripheral grooves; and second retainer clip means removably and threadably secured to said brake shoe table element, engaging another of said friction material element peripheral grooves, and having co-operating wedge elements one of which is fixedly secured to said brake shoe table element and the other of which is adjustably and removably secured to said brake shoe table element by a threaded adjustment screw, said co-operating wedge element causing compression forces to be applied to said preformed friction material element in directions tangential to said brake shoe table element cylindrical support surface to impart curvature to said preformed friction material element when tightening said second retainer clip means threaded adjustment screw such that the radius of said friction element is reduced and causes the central portion of said friction element to be spaced from said brake shoe table element cylindrical support surface.

3. A brake shoe assembly comprising:

a reinforced brake shoe table element having a generally cylindrical support surface for supporting a preformed friction material element;

a preformed friction material element supported by said brake shoe table support surface and having at least two peripheral grooves;

first retainer clip means fixedly secured to said brake shoe table element and engaging one of said friction material element peripheral grooves;

second retainer clip means removably and threadably secured to said brake shoe table element and engaging another of said friction material element peripheral grooves, said second retainer clip means being rotated relative to said friction material element peripheral groove when tightened in its secured relation to said brake shoe table element to cause an additional clamping force further urging said friction material element into a clamped condition relative to the support surface of said reinforced brake shoe table element and;

wherein said second retainer clip means is provided with a retention surface that diverges with respect to a co-operating engagement surface provided in said friction material element peripheral groove, said second retainer clip means diverging at least approximately 3 degrees with respect to the co-operating engagement surface of said friction material element peripheral groove.

4. A brake shoe assembly comprising:

a reinforced brake shoe table element having a generally cylindrical support surface for supporting a preformed friction material element;

a preformed friction material element supported by said brake shoe table support surface and having at least two peripheral grooves;

first retainer clip means fixedly secured to said brake shoe table element and engaging one of said friction material element peripheral grooves;

second retainer clip means removably and threadably secured to said brake shoe table element and engaging another of said friction material element peripheral grooves, said second retainer clip means being rotated relative to said friction material element peripheral groove when tightened in its secured relation to said brake shoe table element to cause an additional clamping force further urging said friction material element into a clamped condition relative to the support surface of said reinforced brake shoe table element and;

wherein said first retainer clip means and said second retainer clip means are each provided with a retention surface that diverges with respect to a co-operating engagement surface provided in said friction material element peripheral groove, said first retainer clip means retention surface and said second retainer clip means retention surface each diverging at least approximately 3 degree with respect to the co-operating engagement surface of said friction material element peripheral groove.

* * * * *